United States Patent
Walker

(10) Patent No.: US 10,513,782 B2
(45) Date of Patent: Dec. 24, 2019

(54) DUAL ALLOY BLADE

(71) Applicant: Siemens Aktiengesellschaft, Munich (DE)

(72) Inventor: Paul Mathew Walker, Dunholme (GB)

(73) Assignee: Siemens Aktiengesellschaft, Munich (DE)

( * ) Notice: Subject to any disclaimer, the term of this patent is extended or adjusted under 35 U.S.C. 154(b) by 193 days.

(21) Appl. No.: 15/559,553

(22) PCT Filed: Mar. 24, 2016

(86) PCT No.: PCT/EP2016/056558
§ 371 (c)(1),
(2) Date: Sep. 19, 2017

(87) PCT Pub. No.: WO2016/156203
PCT Pub. Date: Oct. 6, 2016

(65) Prior Publication Data
US 2018/0044798 A1  Feb. 15, 2018

(30) Foreign Application Priority Data
Apr. 1, 2015 (EP) .................... 15162153

(51) Int. Cl.
*C23C 24/08* (2006.01)
*F01D 5/28* (2006.01)
(Continued)

(52) U.S. Cl.
CPC ............ *C23C 24/08* (2013.01); *C23C 28/021* (2013.01); *F01D 5/288* (2013.01); *F01D 5/3007* (2013.01);
(Continued)

(58) Field of Classification Search
CPC ...... F01D 5/288; F01D 5/3007; F01D 5/3092; C23C 24/08; C23C 28/021
See application file for complete search history.

(56) References Cited

U.S. PATENT DOCUMENTS 5,704,765 A * 1/1998 Amos .................... B23K 9/044
                                                    416/244 A
6,589,668 B1 * 7/2003 Braithwaite ............ F01D 5/288
                                                    416/241 R
(Continued)

FOREIGN PATENT DOCUMENTS

RU        2168558 C2    6/2001
RU        2521925 C2    7/2014

OTHER PUBLICATIONS

EP Search Report dated Oct. 16, 2015, for EP patent application No. 15162153.9.
(Continued)

*Primary Examiner* — Woody A Lee, Jr.
(74) *Attorney, Agent, or Firm* — Beusse Wolter Sanks & Maire

(57) ABSTRACT

A blade for a rotor of a gas turbine has a cast substrate including: a root for connecting the blade to a rotor of a gas turbine, a platform having a lower surface from which the root extends and an upper surface opposite to the lower surface, an aerofoil extending from the upper surface of the platform, the lower surface and the root having an anti-corrosion layer of an high Cr blade alloy over the substrate. A method for manufacturing a blade where the lower surface and the root have the anti-corrosion layer.

8 Claims, 2 Drawing Sheets

(51) Int. Cl.
*C23C 28/02* (2006.01)
*F01D 5/30* (2006.01)

(52) U.S. Cl.
CPC ........ *F01D 5/3092* (2013.01); *F05D 2230/21* (2013.01); *F05D 2230/22* (2013.01); *F05D 2300/132* (2013.01); *Y02T 50/671* (2013.01)

(56) References Cited

U.S. PATENT DOCUMENTS

| | | | | |
|---|---|---|---|---|
| 2005/0255333 A1* | 11/2005 | Bartsch | ................. | B23K 9/042 |
| | | | | 428/655 |
| 2009/0185912 A1* | 7/2009 | Walker | .................... | C23C 10/04 |
| | | | | 416/241 B |
| 2011/0058951 A1* | 3/2011 | Walter | .................... | F01D 5/288 |
| | | | | 416/241 R |
| 2013/0136868 A1* | 5/2013 | Bruck | ....................... | B05D 3/06 |
| | | | | 427/554 |
| 2014/0342186 A1* | 11/2014 | Bostanjoglo | ............ | B32B 15/01 |
| | | | | 428/678 |
| 2015/0034604 A1* | 2/2015 | Subramanian | ............ | B22F 7/02 |
| | | | | 219/73.21 |

OTHER PUBLICATIONS

International Search Report dated Jul. 13, 2016, for PCT/EP2016/056558.
Bonadei A. et al, "Cold sprayed MCrAlY + X coating for gas turbine blades and vanes", ELSEVIER, Surface & Coatings Technology, vol. 242, pp. 200-206, Mar. 15, 2014, Amsterdam NL, http://dx.doi.org/10.1016/j.surfcoat.2013.08.019.

* cited by examiner

DUAL ALLOY BLADE

CROSS REFERENCE TO RELATED APPLICATIONS

This application is the US National Stage of International Application No. PCT/EP2016/056558 filed Mar. 24, 2016, and claims the benefit thereof. The International Application claims the benefit of European Application No. EP15162153 filed Apr. 1, 2015. All of the applications are incorporated by reference herein in their entirety.

FIELD OF INVENTION

The present invention relates to a dual alloy blade, i.e. to a blade having at least two surface portions with different composition.

The present invention further relates to a method for manufacturing a dual alloy blade.

ART BACKGROUND

In a gas turbine engine, air is pressurized in a compressor and mixed with fuel in a combustor for generating hot combustion gases. The hot gases are then channelled towards a gas turbine which transforms the energy from the hot gases into work for powering the compressor and other devices which converts power, for example an upstream fan in a typical aircraft turbofan engine application, or a generator in power generation application.

The gas turbine stages include stationary vanes which channel the combustion gases into a corresponding row of rotor blades extending radially outwardly from a supporting rotor disk. Each rotor blade typically comprises a lower root, for coupling the blade with the turbine rotor, and a aerofoil exposed to the combustion gases channelled through the vanes. Aerofoils may be designed and manufactured hollow in order to save weight, to change its eigenfrequency or to include a cooling circuit therein.

Between the root and the hollow aerofoil, each rotor blade typically further comprises a platform, having an upper surface from which the aerofoil extends. The upper surface of the platform is therefore also exposed to the hot combustion gases channelled through the vanes. The lower surface of the platform faces the root and is instead not exposed in operation to the hot combustion gases channelled through the vanes.

Blade aerofoils and platforms at the first stages of a gas turbine are in contact with combustion gases having the highest range of temperatures, typically higher than 900° C. In such high-temperature environment, high creep strength is required for the aerofoils and the upper surfaces of the platforms.

To achieve this requirement modern alloys used for such components are very low in Cr.

On the other end, the roots and the lower surfaces of the platforms are subject to lower temperatures. In such conditions, the same low Cr alloy mentioned above can be susceptible to low temperature hot corrosion and corrosion fatigue cracking.

Potentially, a mechanical design solution could manufacture two parts to operate in different environments, but the join would always be of questionable integrity. Other solutions such as coating technologies have been readily used, but have proven to be not optimal.

SUMMARY OF THE INVENTION

It is an object of the present invention to provide a blade for a gas turbine comprising two portions which could respectively operate in different environments, but without compromising the integrity of the blade itself.

It is a further object of the present invention to provide a manufacturing method for producing such a blade.

In order to achieve the objects defined above, a blade and a manufacturing method according to the independent claim are provided. The dependent claims describe advantageous developments and modifications of the invention.

According to a first aspect of the present invention, a blade for a rotor of a gas turbine comprising a cast substrate including: —a root for connecting the blade to a rotor of a gas turbine, —a platform having a lower surface from which the root extends and an upper surface opposite to the lower surface, —an aerofoil extending from the upper surface of the platform, wherein the lower surface and the root comprises an anti-corrosion layer of an high Cr blade alloy over the substrate.

According to a second aspect of the present invention, a method of manufacturing a blade for a rotor of a gas turbine comprising the step of: —casting a substrate including a root for connecting the blade to a rotor of a gas turbine, a platform having a lower surface from which the root extends and an upper surface (62) opposite to the lower surface, an aerofoil extending from the upper surface of the platform, —adding by means of an additive manufacturing process an anti-corrosion layer of an high Cr blade alloy over the substrate on the lower surface and the root.

Advantageously, the anti-corrosion layer of a high Cr blade alloy over the substrate will minimize low temperature hot corrosion and corrosion fatigue cracking on the lower portion of the blade, not exposed in operation to the hot combustion gases channelled through the vanes The additive material processing provides the further advantage of minimizing porosity and any other deleterious effect during the solidification of the additive material.

According to possible embodiments of the present invention, the additive manufacturing process consists of one of the following: —Selective Laser Melting (SLM), —Selective Laser Sintering (SLS), —3D printing.

After the additive manufacturing process, a further step of Hot Isostatic Pressure (HIP) may be applied to the anti-corrosion layer for reducing voids created during the additive manufacturing process.

According to possible embodiments of the present invention, the high Cr blade alloy comprises 15 to 23% Cr. Such a percentage has proved to be optimal with reference to the anti-corrosion requirements for the lower portion of the blade.

According to other possible embodiments of the present invention, the anti-corrosion layer has a thickness of minimum 1 mm. Such a thickness refers to a layer having an high Cr percentage and therefore it does not include any dilution layer between the substrate of the blade and the anti-corrosion layer or any stock allowance which may be provided on the root and then machined for creating the coupling surfaces of the root.

According to other possible embodiments of the present invention, a further intermediate layer is provided between the substrate and the anti-corrosion layer, the intermediate layer having a percentage composition in Cr comprised between the percentage composition in Cr of the substrate and the percentage composition in Cr of the anti-corrosion layer. Advantageously this limits the thickness of the dilution layer.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to such examples of embodiment, but to which the invention is not to be considered limited.

DETAILED DESCRIPTION

Figure 1:
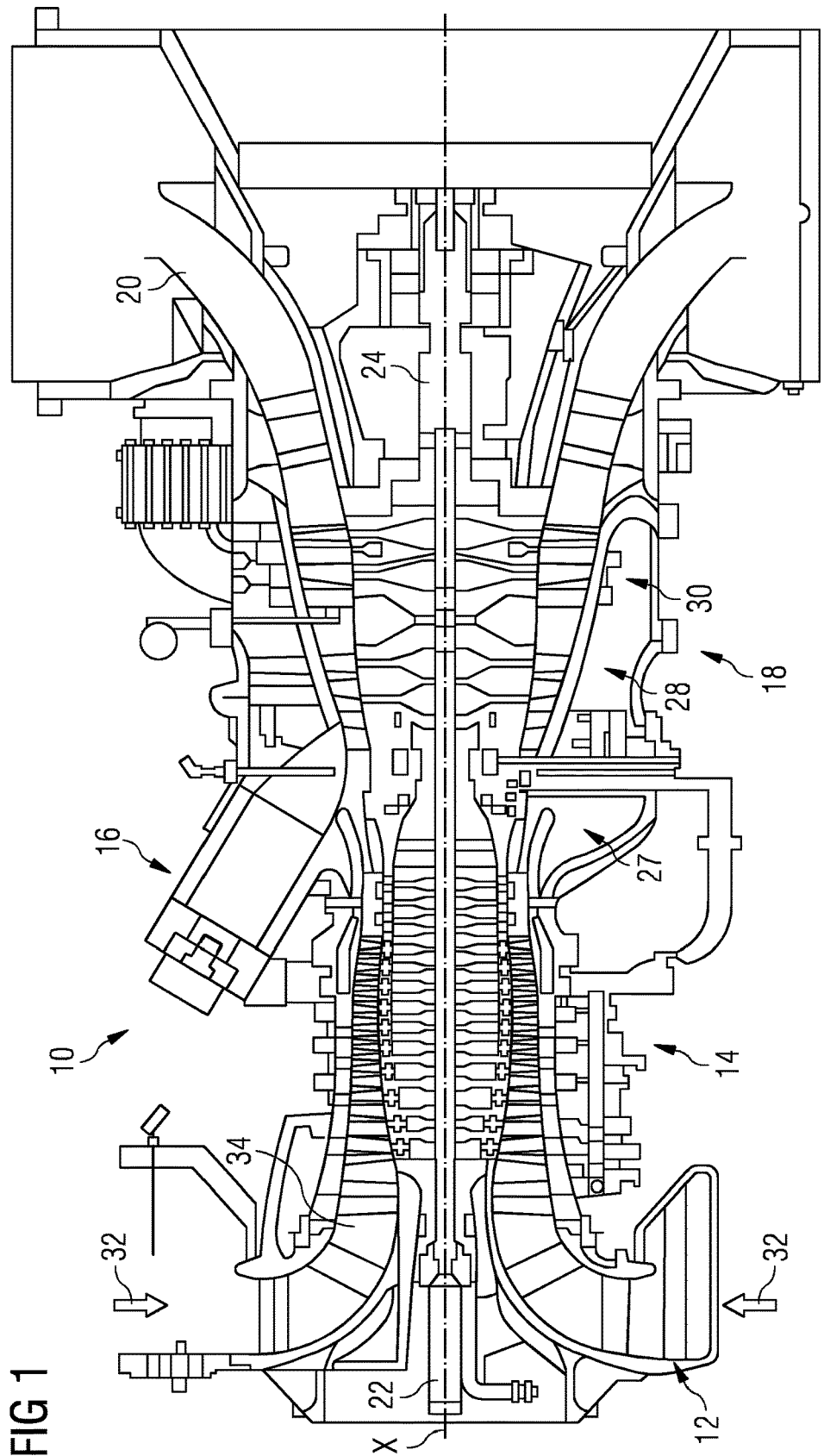
FIG. 1 is a longitudinal sectional view of a gas turbine engine including a plurality of rotor blades according to the present invention.

FIG. 1 shows a schematic illustration of a general arrangement of a turbine engine 10 having an inlet 12, a compressor 14, a combustor system 16, a turbine system 18, an exhaust duct 20 and a shaft arrangement 22. The turbine engine 10 is generally arranged about a rotational axis X which for rotating components is their rotational axis. The combustion system 16 comprises an annular array of combustor units 36, only one of which is shown. For example, in one embodiment, there may be six combustor units evenly spaced about the engine. The turbine system 18 includes a high-pressure turbine 28 drivingly connected to the compressor 14 by the shaft arrangement 22, 24. In the embodiment of FIG. 1 the shaft arrangement 22, 24 is a twin-shaft arrangement including a first shaft 22 and a second shaft 24. The turbine system 18 also includes a low-pressure turbine 30 drivingly connected to a load (not shown) via the second shaft 24. According to other embodiments of the present invention, the turbine engine 10 has a single-shaft arrangement.

The compressor 14 comprises an axial series of stator vanes and rotor blades mounted in a conventional manner. The stator or compressor vanes may be fixed or have variable geometry to improve the airflow onto the downstream rotor or compressor blades. Each turbine 28, 30 comprises an axial series of stator vanes 33 and rotor blades 51 mounted via rotor discs 35 arranged and operating in a conventional manner. A rotor assembly 36 comprises an annular array of rotor blades 51 and the rotor disc 35.

The terms radial, circumferential and axial are with respect to the rotational axis X. Therefore, any radial direction is orthogonal to the rotational axis X, i.e. parallel to the rotor blades 51. The circumferential direction is a curved circular direction, parallel to the rotation of the turbine engine 10 around the rotational axis X. The terms upstream and downstream are with respect to the general direction of gas flow through the engine and as seen in FIG. 1 is generally from left to right.

In operation air 32 is drawn into the engine 10 through the inlet 12 and into the compressor 14 where the successive stages of vanes and blades compress the air before delivering the compressed air into the combustion system 16. In a combustion chamber 37 of the combustion system 16 the mixture of compressed air and fuel is ignited. The resultant hot working gas flow is directed into, expands and drives the high-pressure turbine 28 which in turn drives the compressor 14 via the first shaft 22. After passing through the high-pressure turbine 28, the hot working gas flow is directed into the low-pressure turbine 30 which drives the load via the second shaft 24.

The low-pressure turbine 30 can also be referred to as a power turbine and the second shaft 24 can also be referred to as a power shaft. The load is typically an electrical machine for generating electricity or a mechanical machine such as a pump or a process compressor. Other known loads may be driven via the low-pressure turbine. The fuel may be in gaseous and/or liquid form.

The turbine engine 10 shown and described with reference to FIG. 1 is just one example of a number of engines or turbomachinery in which this invention can be incorporated. Such engines can be gas turbines or steam turbine and include single, double and triple shaft engines applied in marine, industrial and aerospace sectors.

Figure 2:
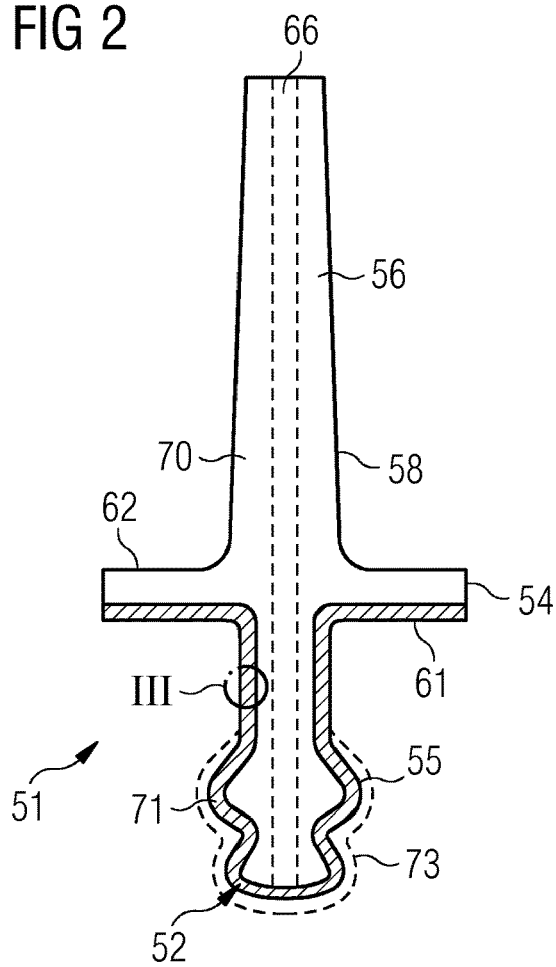
FIG. 2 shows a sectional view of a rotor blade according to the present invention.
Figure 3:
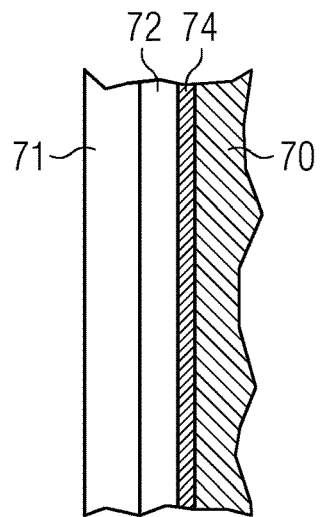
FIG. 3 shows a magnified view of the detail III of FIG. 2.

With reference to the sectional views of FIGS. 2 and 3, each rotor blade 51 comprises: —a root 52 for connecting the blade 51 to the rotor disk 35, by means of a plurality of serrations 55 engaging correspondent mating serrations (not shown) in the rotor disk 35, —a platform 54 having a lower surface 61, from which the root 52 extends and an upper surface 62 opposite to the lower surface 61, —a hollow aerofoil 56 extending from the upper surface 62 of the platform 54 and having an external surface 58.

When the root 52 is connected to the rotor disk 35 by means of the plurality of serrations 55, the blades extend radially from the respective root 52 up towards the tip of the hollow aerofoil 56.

In operation, the external surface 58 of the hollow aerofoil 56 and the upper surface 62 of the platform 54 are exposed to the working gas flowing in the gas turbine 28, 30.

The root 52, platform 54 and hollow aerofoil 56 may be portions of a common body 70, obtained through casting and constituting a substrate to which a plurality of surfaces may be added, in order to protect the blade from the high temperature of the hot working gas.

The external surface 58 of the hollow aerofoil 56 and the upper surface 62 of the platform 54 may be covered by a thermal barrier coating (TBC) for protecting them from corrosion.

The aerofoil 56 has a conventional comprising a leading edge at which the flowing working gas arrive at the aerofoil 56 and a trailing edge at which the combustion gases leave the aerofoil 56.

The external surface 58 is formed by suction side and a pressure side. Both the suction side and the pressure side extend from the leading edge to the trailing edge. In operation, the working gas flows over the platform 54 the leading edge to the trailing edge.

One (or more) inner cooling passage(s) 66 is (are) provided inside the aerofoil 56, the platform 54 and the root 55 for the flowing of a cooling medium, for cooling the blade 51 in operation, i.e. when the blade 51 is in contact with the hot working gas.

According to a different embodiment of the present invention (not shown), the aerofoil 56 may be solid, without any cooling passage without any internal passages to allow the flowing of a cooling fluid.

According to the different embodiments of the present invention, a high Cr blade alloy layer 71 is added by means of an additive manufacturing process to the substrate 70 of the lower surface 61 of the platform 54 and to the surface of the entire root 55. The high Cr blade alloy layer 71 provides high resistance to low temperature hot corrosion and corrosion fatigue cracking in the portion of the blade under the platform 54, i.e. to the portion which is not directly exposed to the hot working gas.

After the formation of the high Cr alloy anti-corrosion layer 71, a dilution layer 74 will form at the interface between the anti-corrosion layer 71 and the substrate 70. The dilution layer 74 is a layer having a range of compositions intermediate between the high Cr alloy layer 71 and the substrate 70. The thickness of the dilution layer 74 depends from the composition of the anti-corrosion layer 71.

The anti-corrosion layer 71, not comprising the dilution layer 74, has a thickness of 1 mm or more.

The high Cr blade alloy layer 71 is built by additive manufacturing techniques, for example by Selective Laser Melting (SLM), Selective Laser Sintering (SLM), electron-beam melting, selective heat sintering, 3D printing or electron beam freeform fabrication. Particularly the solutions using lasers (e.g. selective laser melting, selective laser sintering) allow very fine structures and fine geometries.

Optionally, a further step of Hot Isostatic Pressure (HIP) may be applied to the anti-corrosion layer 71 for reducing voids created during the additive manufacturing process.

According to possible embodiments of the present invention, the high Cr blade alloy layer 71 comprises 15 to 23% Cr.

In particular, the high Cr blade alloy layer 71 may be of the IN939 type and may have the following ranges of percentage composition:

Carbon (C): 0.13-0.17
Chromium (Cr): 22.0-22.8
Cobalt (Co): 18.5-19.5
Tungsten (W): 1.8-2.2
Niobium (Nb): 0.9-1.1
Tantalum (Ta): 1.3-1.5
Titanium (Ti): 3.6-3.8
Aluminium (Al): 1.8-2.0
Zirconium (Zr): 0.02-0.03
Iron (Fe): 0.5 max
Silicon (Si): 0.2 max
Manganese (Mn): 0.2 max
Boron (Bo): 0.004-0.006 (40-60 ppm)
Sulphur (S): 0.005 max (50 ppm max)
Nitrogen (N): 0.005 max (50 ppm max)
Oxygen (0): 0.002 max (20 ppm max)
Silver (Ar): 0.0005 max (5 ppm max)
Selenium (Se): 0.0005 max (5 ppm max)
Bismuth (Bi): 0.00005 max (0.5 ppm max)
Lead (Pb): 0.00005 max (0.5 ppm max)
Nickel (Ni): BALANCE According to possible embodiments of the present invention, a further intermediate layer 72 is provided between the substrate and the anti-corrosion layer 71, the intermediate layer having a percentage composition in Cr comprised between the percentage composition in Cr of the substrate 70 and the percentage composition in Cr of the anti-corrosion layer 71. The intermediate layer 72 limits the dilution effect, i.e. the reduction of concentration of Cr in the portion of the anti-corrosion layer 71, 72 closer to the substrate 70. As a result, in the embodiments where the intermediate layer 72 is provided, the dilution layer 74 will be less thick.

Optionally, during the step of adding anti-corrosion layer 71 a stock allowance 73 is provided on the root 55, the method further comprising the step of machining the anti-corrosion layer 71 and removing the stock allowance 73.

After the stock allowance 73 is removed, according to the present invention, the anti-corrosion layer 71, not comprising the dilution layer 74 or the intermediate layer 72, will have a thickness of 1 mm or more.

According to the present invention, the traditional blade manufacture, including the casting of a single body having a root, a platform and an aerofoil, and the additive manufacturing process are used to generate a dual alloy blade. In the lower portion of the blade, the high Cr alloy seals of the low Cr alloy from the environment results in a blade able to be used in the first row of blades of a gas turbine, i.e. where temperature conditions of the working gas would normally prevent high Cr high strength alloys, for example IN939 alloys, from being used.

The invention claimed is:

1. A blade for a rotor of a gas turbine with a cast substrate, comprising:
    a root for connecting the blade to the rotor of the gas turbine,
    a platform comprising a lower surface from which the root extends and an upper surface opposite to the lower surface,
    an aerofoil extending from the upper surface of the platform, the aerofoil comprising an external surface, and
    an anti-corrosion layer of a high Cr blade alloy over the cast substrate added by means of an additive manufacturing process to the lower surface and the root only, the high Cr blade alloy comprising 15% to 23% Cr,
    wherein the cast substrate comprises a low Cr alloy, and wherein the external surface of the aerofoil and the upper surface of the platform is covered by a thermal barrier coating.

2. The blade according to claim 1,
    wherein the anti-corrosion layer comprises a thickness of minimum 1 mm.

3. The blade according to claim 1, further comprising:
    an intermediate layer between the cast substrate and the anti-corrosion layer,
    wherein the intermediate layer has a percentage composition in Cr comprised between the percentage composition in Cr of the cast substrate and the percentage composition in Cr of the anti-corrosion layer.

4. A method of manufacturing a blade for a rotor of a gas turbine comprising:
    casting a substrate including a root for connecting the blade to the rotor of the gas turbine, a platform comprising a lower surface from which the root extends and an upper surface opposite to the lower surface, an aerofoil extending from the upper surface of the platform, the aerofoil comprising an external surface,
    adding by means of an additive manufacturing process an anti-corrosion layer of a high Cr blade alloy over the substrate on the lower surface and the root only, the high Cr blade alloy comprising 15% to 23% Cr,
    wherein the cast substrate comprises a low Cr alloy, and wherein the external surface of the aerofoil and the upper surface of the platform is covered by a thermal barrier coating.

5. The method according to claim 4, wherein the additive manufacturing process consists of one of:
    Selective Laser Melting (SLM),
    Selective Laser Sintering (SLS),
    3D printing.

6. The method according to claim 5, further comprising:
applying Hot Isostatic Pressure (HIP) to the anti-corrosion layer for reducing voids created during the additive manufacturing process.

7. The method according to claim 4, further comprising:
creating an intermediate layer over the substrate on the lower surface and the root, the intermediate layer comprising a percentage composition in Cr comprised between the percentage composition in Cr of the substrate and the percentage composition in Cr of the anti-corrosion layer, the anti-corrosion layer being subsequently created by additive manufacturing over the intermediate layer.

8. The method according to claim 4,
wherein during the adding of the anti-corrosion layer, a stock allowance comprising the high Cr blade alloy is provided on the root,
and further comprising machining the anti-corrosion layer and removing the stock allowance.

\* \* \* \* \*